United States Patent
Naslund et al.

(10) Patent No.: US 6,929,332 B2
(45) Date of Patent: Aug. 16, 2005

(54) STAMPED ABS SENSOR BRACKET

(75) Inventors: Emil Naslund, Marysville, OH (US); Vipan K. Bhalla, Findlay, OH (US); James A. E. Mills, Llangollen (GB)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/306,102

(22) Filed: Nov. 27, 2002

(65) Prior Publication Data

US 2004/0100144 A1 May 27, 2004

(51) Int. Cl.$^7$ ............................. B60B 35/00; G01P 3/42
(52) U.S. Cl. ................................. 301/124.1; 248/74.1
(58) Field of Search ........................... 301/105.1, 124.1; 248/65, 74.1; 324/173, 174, 207.22, 207.25; 188/181 R

(56) References Cited

U.S. PATENT DOCUMENTS

| | | | | |
|---|---|---|---|---|
| 3,173,639 A | * | 3/1965 | Dunn | 248/65 |
| 3,890,517 A | * | 6/1975 | Marsh et al. | 310/168 |
| 3,931,998 A | * | 1/1976 | Carson | 301/5.24 |
| 4,090,099 A | * | 5/1978 | Daffron | 310/168 |
| 5,092,547 A | * | 3/1992 | Richards | 248/62 |
| 5,547,152 A | * | 8/1996 | Krock | 248/74.1 |
| 5,650,720 A | * | 7/1997 | Brockmuller et al. | 324/173 |
| 5,704,692 A | * | 1/1998 | Purdy et al. | 301/105.1 |
| 5,943,985 A | * | 8/1999 | Hartman | 122/511 |
| 6,173,927 B1 | * | 1/2001 | Delsol | 248/74.1 |
| 6,359,431 B1 | * | 3/2002 | Coles | 324/174 |
| 2002/0175258 A1 | * | 11/2002 | White et al. | 248/314 |

* cited by examiner

*Primary Examiner*—Russell D. Stormer
(74) *Attorney, Agent, or Firm*—Carlson, Gaskey & Olds

(57) ABSTRACT

A vehicle axle is provided that includes a spindle supporting a wheel hub having a toothed wheel. A tapered axle portion is adjacent to said spindle, and an ABS sensor bracket is secured to the tapered portion. The bracket has a body defining a hole receiving an ABS sensor adjacent the toothed wheel. The bracket includes a pedestal extending from the body and terminating in a base extending transversely from the pedestal. Reinforcing ribs may be used between the base and pedestal to strengthen the area. The base secured to the axle portion by a weld arranged in a notch in the base and another weld arranged at the rear of the base. The bracket is preferably secured to the axle by an automated process in which the axle is already precisely oriented for a procedure to the axle, such as the attachment of the brake spider.

10 Claims, 2 Drawing Sheets

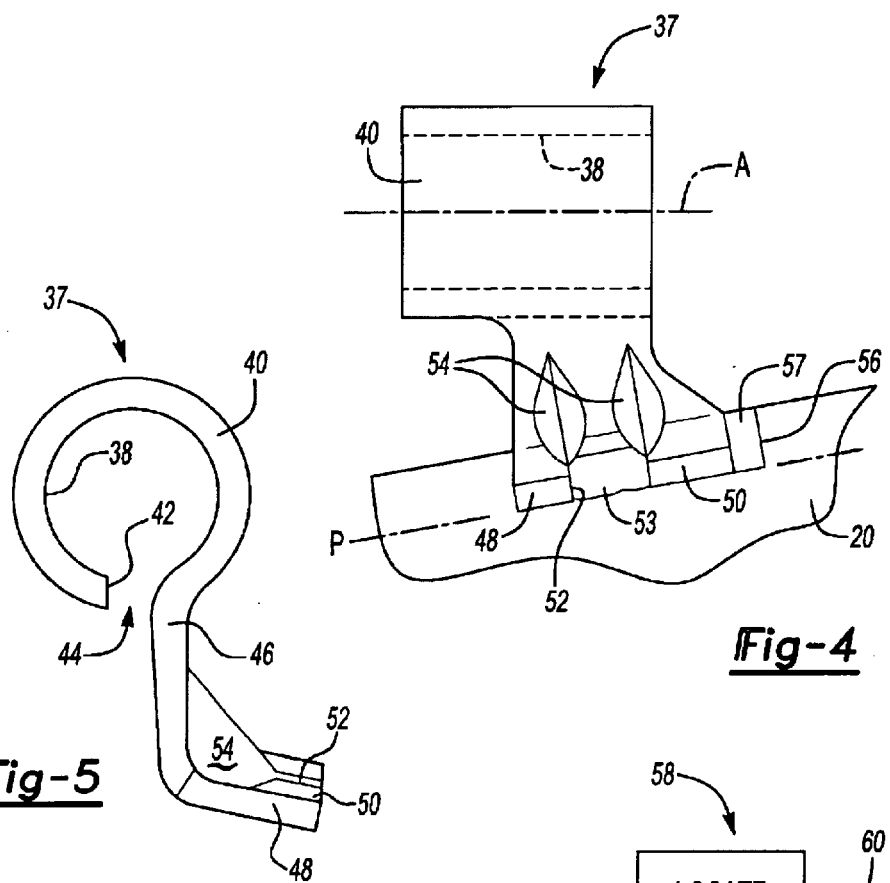
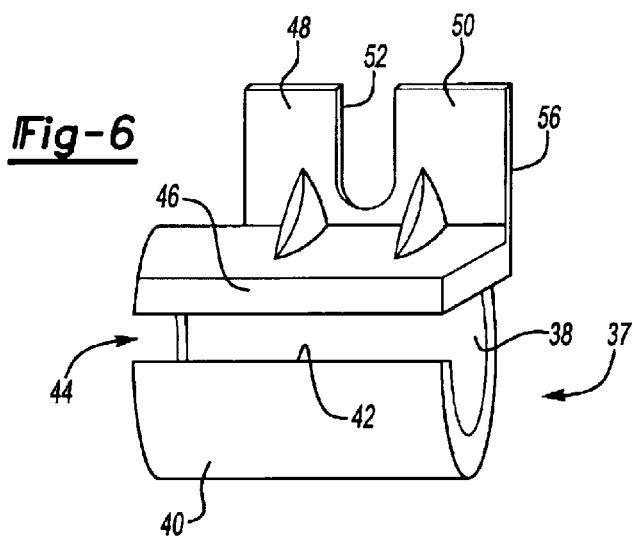
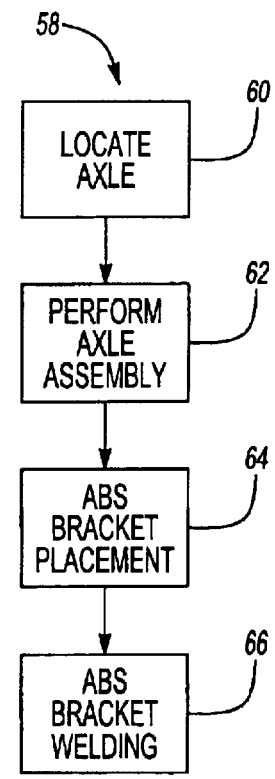

STAMPED ABS SENSOR BRACKET

BACKGROUND OF THE INVENTION

This invention relates to a vehicle axle incorporating anti-lock braking, and more particularly, the invention relates to an anti-lock braking system (ABS) sensor bracket used to support an ABS sensor on the axle.

Commercial trailer axles incorporate ABS to better control heavily loaded trailers during braking to prevent loss of control of the vehicle. The wheel hubs supported on the ends of the axle each have a toothed wheel that rotates with the hubs. An ABS sensor is supported on the axle by a bracket proximate to the toothed wheel to detect the rotation of the wheel hub. The sensor is connected to an ABS controller that monitors the rotation of the wheel hub during braking to detect locking of the wheels. The controller commands the brakes to maximize the braking force between the wheels and the roadway without locking up the wheels.

The ABS sensor bracket is typically a solid piece of machined metal that is expensive to manufacture and secure to the axle. The bracket has a pedestal with a bottom surface that is adjacent to an axle portion exterior. The bracket is secured to the axle by a weld bead on either side of the pedestal. Since the bottom surface is flat, the weld bead must fill the gap between the bottom surface and the curved axle exterior to obtain a robust attachment of the bracket to the axle, which is a difficult process to control. The bracket is secured to the axle in a separate operation in which the orientation of the axle is not closely controlled so that proper position of the bracket relative to the axle is not always achieved. Therefore, what is needed is a more cost effective ABS sensor bracket and method of attachment.

SUMMARY OF THE INVENTION AND ADVANTAGES

The present invention provides a vehicle axle including a spindle supporting a wheel hub having a toothed wheel. A tapered axle portion is adjacent to said spindle, and an ABS sensor bracket is secured to the tapered portion. The bracket has a body defining a hole receiving an ABS sensor adjacent the toothed wheel. The bracket includes a pedestal extending from the body and terminating in a base extending transversely from the pedestal. Reinforcing ribs may be used between the base and pedestal to strengthen the area. The base secured to the axle portion by a weld arranged in a notch in the base and another weld arranged at the rear of the base. The bracket is preferably secured to the axle by an automated process in which the axle is already precisely oriented for a procedure to the axle, such as the attachment of the brake spider.

Accordingly, the above invention provides a more cost effective ABS sensor bracket and method of attachment.

BRIEF DESCRIPTION OF THE DRAWINGS

Other advantages of the present invention can be understood by reference to the following detailed description when considered in connection with the accompanying drawings wherein:

FIG. 4 is a side view of the present invention stamped ABS sensor bracket;

FIG. 5 is an end view of the bracket shown in FIG. 4;

FIG. 6 is a bottom view of the bracket shown in FIG. 4; and

FIG. 7 is a flow chart of a present invention method of attaching the present invention ABS bracket to an axle.

DETAILED DESCRIPTION OF THE PREFERRED EMBODIMENT

Figures 1, 2, 3:
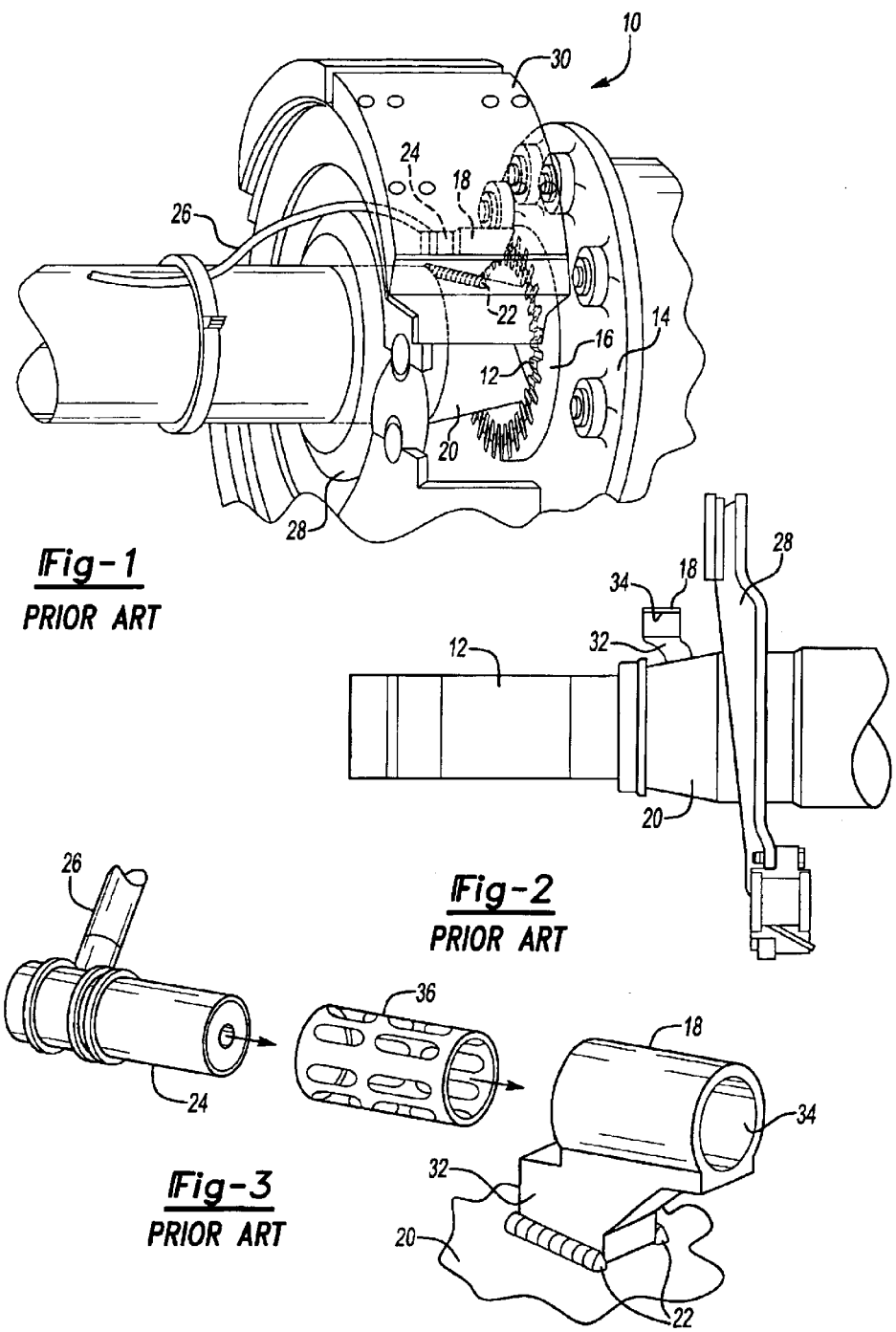
FIG. 1 is a perspective view of an axle with ABS using a prior art ABS sensor bracket.
FIG. 2 is a side view of the prior art ABS sensor bracket.
FIG. 3 is a perspective exploded view of an ABS sensor being installed into the prior art ABS bracket.

A prior art axle 10 is shown in FIGS. 1 and 2. The axle 10 includes a spindle 12 that supports a hub 14 for rotation. The hub 14 has a toothed wheel 16 secured thereto for rotation with the hub. A solid metal ABS bracket 18 is secured to a tapered portion 20 adjacent to the spindle 12 by weld beads 22 on opposing sides of the bracket 18. The bracket 18 supports a sensor 24 proximate to the toothed wheel 16 for sensing the rotation of the wheel hub 14. A cable 26 electrically connects the sensor 24 to an ABS controller. Referring to FIG. 2, the bracket 18 is located between a brake spider 28 and the spindle 12. The spider 28 supports brake shoes 30 that are modulated by the controller as necessary during braking to prevent the wheels from locking up. As shown in FIG. 3, a pedestal 32 of the prior art bracket 18 is secured to the axle 10 by weld beads 22 that must fill the gap formed between the flat bottom surface of the pedestal 32 and the axle portion 20. The body of the bracket 18 has a hole 34 that receives the sensor 24. A spring clip 36 is arranged in the hole 34 between the body and the sensor 24 to retain the sensor in the bracket.

Referring to FIGS. 4–6, the present invention ABS sensor bracket 37 is stamped metal. The bracket 37 may be manufactured using a suitable forming process, such as progressive dies, to form the features of the bracket. The bracket 37 has a body with a portion 40 defining a hole 38 for receiving the sensor. The portion 40 includes a terminal end 42 that is adjacent to the pedestal 46 and may be spaced there from to form a gap 44. The gap 44 is contiguous with the hole 38. The terminal end 42 may extend in the direction of the pedestal 46, as shown, or may depend downward away from the hole 38.

A base extends transversely from the pedestal 46 and may include a notch 52 defining first 48 and second 50 toes. The toes 48 and 50 are preferably greater than 90 degrees from the pedestal 46 and preferably include reinforcing ribs 54 to ensure that the angle between the pedestal 46 and toes 48 and 50 are maintained. The base defines a plane P that is transverse to the axis A defined by the hole 38, which accommodates the slope of the tapered portion 20. The toes 48 and 50 are spaced along this axis A. A weld bead 53 is arranged in the notch 52 to secure the bracket 37 to the axle portion 20. The notch 52 provides sufficient surface area to achieve a robust attachment and filling any gaps between the bracket 37 and the axle portion 20 is not of great concern. However, if additional support is desired, a weld bead 57 may secure the rear surface 56 of one of the toes to the portion 20.

During assembly 458 of the axle 10, which is schematically depicted in FIG. 7, the axle 10 is located in a desired orientation at an axle assembly station, as shown at block 60. Precise positioning of the axle is achieved to conduct an operation on the axle that requires accurate alignment relative to the axle, as shown at block 62. For example, assembly of the brake spider is done relative to the axle as is setting tho camber of the spindle. With the axle in a precisely known orientation, the stamped ABS sensor bracket 37 may be automatically place or a desired location on the axle, as shown at block 64. A robotic arm may load the bracket 37 to the desired location, and the bracket way be welded onto the axle, as shown at black 66.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle axle comprising:

a swindle supporting a wheel hub having a toothed wheel;

an axle body having a portion adjacent to said spindle;

an ABS sensor bracket having a body forming a hole for receiving an ABS sensor adjacent to said toothed wheel, said hole defining an axis, and said ABS sensor bracket having a pedestal extending from said body and terminating in a base extending transversely from said pedestal, said base secured to said portion by a weld, wherein said base includes a notch forming toes spaced axially from each other, with said notch being axially intermediate said toes, said weld disposed in said notch between said toes securing said toes to said portion.

2. The vehicle axle as set forth in claim 1, wherein said portion has a conical outer peripheral surface, and said base defining a lower surface, said lower surface being non-parallel to said axis such that said lower surface corresponds to said conical outer peripheral surface.

3. The vehicle axle as set forth in claim 1, wherein said hole is defined by said body extending upwardly to an end that curves to extend in a first direction away from a remainder of said body, and then in a second direction back toward the remainder of said body to form said hole.

4. The vehicle axle as set forth in claim 3, wherein the end of said body is spaced from the remainder or said body.

5. The vehicle axle as set forth in claim 4, wherein said base extends from said pedestal in a direction with at least a component of said second direction.

6. A vehicle axle comprising:

a spindle supporting a wheel hub having a toothed wheel;

an axle body having a portion adjacent to said spindle;

an ABS sensor bracket having a body forming a hole for receiving an ABS sensor adjacent to said toothed wheel, said ABS sensor bracket having a pedestal extending from said body and terminating in a base extending transversely from said pedestal, said base secured to said portion by a weld wherein a reinforcing rib bridges said pedestal and said base; and said hole being defined by said body extending upwardly to an end that curves to extend in a first direction away from a remainder of said body, and then in a second direction back toward the remainder of said body to form said hole.

7. The vehicle axle as set forth in claim 6, wherein said portion has a conical outer peripheral surface, said hole defining an axis, and said base defining a lower surface, said lower surface being non-parallel to said axis such that said lower surface corresponds to said conical outer peripheral surface.

8. The vehicle axle as set forth in claim 6, wherein the end of said body is spaced from the remainder of said body.

9. The vehicle axle as set forth in claim 8, wherein said base extends from said pedestal in a direction with at least a component of said second direction.

10. A vehicle axle comprising:

a spindle supporting a wheel hub having a toothed wheel;

an axle body having a portion with a conical outer peripheral surface adjacent to said spindle;

an ABS sensor bracket having a body forming a hole for receiving an ABS sensor adjacent to said toothed wheel, said hole defining an axis, said ABS sensor bracket having a pedestal extending from said body and terminating in a base extending transversely from said pedestal, said base secured to said portion by a weld, a lower surface of said base being non-parallel to said axis such that said lower surface corresponds to said conical outer peripheral surface.

\* \* \* \* \*